Figure 1:
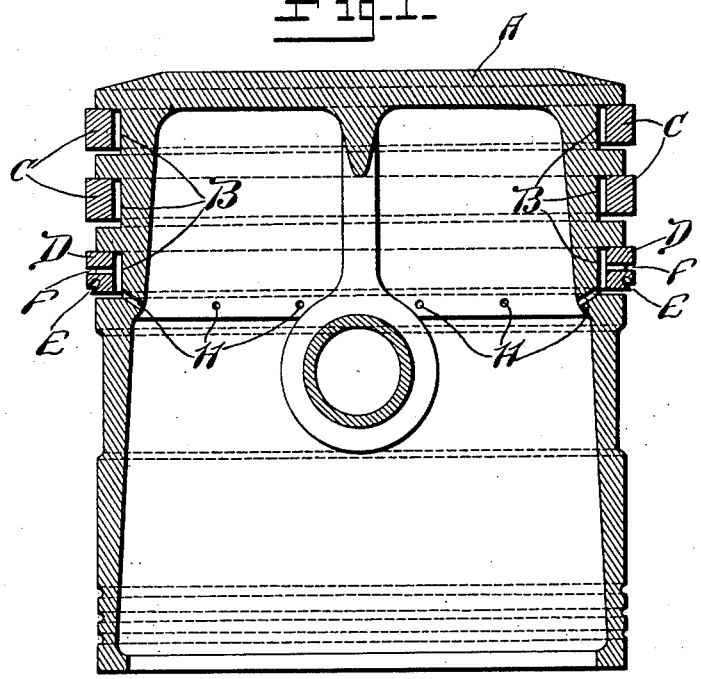

Dec. 29, 1925.

A. J. MUMMERT 1,567,452

PISTON AND PISTON RING

Filed July 23, 1925

Inventor.
Arden John Mummert,
by Henry Kinealy
His Attorney.

Patented Dec. 29, 1925.

1,567,452

UNITED STATES PATENT OFFICE.

ARDEN JOHN MUMMERT, OF UNIVERSITY CITY, MISSOURI, ASSIGNOR TO McQUAY-NORRIS MANUFACTURING COMPANY, OF ST. LOUIS, MISSOURI, A CORPORATION OF DELAWARE.

PISTON AND PISTON RING.

Application filed July 23, 1925. Serial No. 45,628.

*To all whom it may concern:*

Be it known that I, ARDEN JOHN MUMMERT, a citizen of the United States, residing in University City, in the county of St. Louis and State of Missouri, have invented a new and useful Improvement in Pistons and Piston Rings, of which the following is a full, clear, and exact specification, reference being had to the accompanying drawings, which form a part thereof.

My invention relates to pistons and piston rings and more particularly to pistons and piston rings which are ordinarily used in internal combustion engines such as used in automobiles. In these it is desirable to maintain as great a compression as possible and to prevent as far as possible the passage of oil upwardly past the cylinder contacting faces of the rings used therewith into the combustion chamber while allowing enough oil between the cylinder contacting surface of the piston rings and the wall of the cylinder to provide proper lubrication so that the wall of the cylinder will not become worn or scored because of insufficient lubrication.

Heretofore piston rings have had oil receiving grooves therein with one of the walls of the groove meeting the cylinder contacting face of the ring to form a scraping edge which operates on the downward stroke of the piston to scrape oil from the wall of the cylinder in which the piston reciprocates and the other wall of the groove operating on the return or upward stroke of the piston to discharge the oil thus collected onto the cylinder wall to lubricate the various contacting surfaces of the piston and cylinder during the upward stroke. Such a ring, and more particularly a ring having a groove such as described and claimed in Letters Patent No. 1,210,674 issued to me on January 2, 1917, operates effectually to prevent oil pumping and to lubricate the piston at low speeds, but the design of the internal combustion engines such as used in automobiles has changed and now the trend is toward high speed engines with small cylinders and with pistons which operate at greatly increased piston speeds. At high piston speeds there is a tendency for a body of oil to accumulate between the cylinder contacting face of the ring and the cylinder wall, which accumulation of oil forces the cylinder contacting face of the ring away from the cylinder wall so as to render the scraping edge inoperative to scrape oil from the cylinder wall on the downward stroke of the piston. When this occurs oil passes upwardly past the piston ring and into the combustion chamber where the oil is carbonized with a resultant decrease in the efficiency of the operation of the engine.

The object of my invention is to provide a piston and a piston ring for use therewith in an internal combustion engine which piston and piston ring will more effectually prevent an accumulation of oil whereby the piston ring may be moved out of contact with the cylinder wall during the reciprocations of the piston and which will remove from the cylinder wall such oil as is not needed for lubrication of the piston and will allow this oil to drain through proper ports into the hollow interior of the piston and thence into the crank case of the engine.

Figure 2:
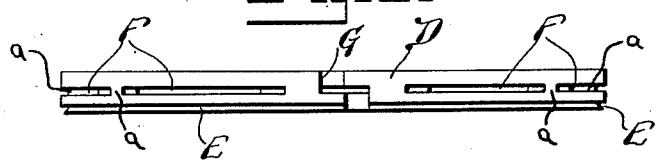
Figure 3:
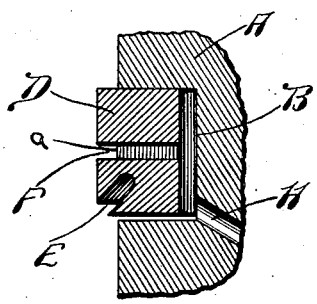
Figure 4:
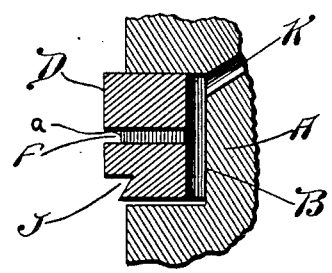

My invention is fully shown in the accompanying drawings wherein similar letters are used to designate similar parts: Fig. 1 is a section of a piston and piston ring embodying one form of my invention; Fig. 2 shows the piston ring embodying by invention; Fig. 3 is a detail view of part of Fig. 1; and Fig. 4 is a detail view showing in section a modified form of my invention.

Refering to the figures, in the embodiment of my invention shown in the drawings the piston A, which is preferably hollow as shown in Fig. 1, has a plurality of ring receiving grooves B formed in the outer face, and, preferably, near the top thereof. As shown in Fig. 1 three of the ring receiving grooves are provided, and in two of them are placed ordinary snap rings C which need not be of any special form or shape. In the lowermost of the ring receiving grooves B, as shown in Fig. 1, is placed a piston ring D embodying my invention. This piston ring D comprises a resilient spit band having an annular groove E formed at the lower edge of the cylinder contacting face thereof. The groove E, preferably, has the front wall thereof meeting the cylinder contacting face of the ring in outwardly convergent relation thereto to form a peripherally disposed scraping edge, as shown in Fig. 3, and has the rear wall thereof substantially parallel to the front wall and meeting the lower end face of the ring at a point inside the cylinder contacting face thereof in outwardly convergent relation so as to return on the upwardly stroke of the piston the oil collected on the downward stroke. The oil thus returned serves to lubricate the various parts, as hereinafter described.

Positioned above the grooves E are, preferably, one or more passages which, in the embodiment of my invention shown in the drawings, are in the form of radial slots F positioned substantially midway between the upper and lower end faces of the ring and which lead from the cylinder contacting face of the ring to the rear face thereof and which open at their rear ends into the space between the rear face of the ring and the vertical bottom of the piston ring receiving groove. Adjacent slots F are separated by ribs a. A plurality of ports H are arranged to lead from the bottom of the ring receiving groove B into the hollow interior of the piston A. These ports H may lead from the lower corner of the ring receiving groove B and may be inclined downwardly as shown in Figs. 1 and 3.

While the groove E in my new and improved piston ring D may be of the shape in cross section and may be positioned as is the groove E shown in Figs. 1, 2, and 3, I do not intend to limit myself to this form of groove. One of the modified forms of the groove is shown in Fig. 4 wherein the groove J has a scraping wall which meets the cylinder contracting face of the piston ring D at substantially a right angle thereto. However, I prefer that in any embodiment of my invention the front or scraping wall of the groove meets the cylinder contacting face of the piston ring D at a less angle than a right angle since if the scraping wall of the groove met the cylinder contacting face at an obtuse angle the scraping edge formed would not be as efficient in scraping the oil from the cylinder wall as would be a scraping edge formed by the meeting of the wall of the groove and the cylinder contacting face of the ring in the two forms of grooves shown in the drawings.

Likewise in Fig. 4 upwardly inclined ports K leading from substantially the upper corner of the ring receiving groove B are provided instead of the downwardly inclined ports H of Figs. 1 and 3.

The operation of my piston and piston ring in use in an internal combustion engine is as follows:—When the engine is operated at a slow piston speed on the downward stroke of the piston the scraping edge formed by the front wall of the groove E and the cylinder contacting face of the ring scrapes the oil from the wall of the cylinder in which the piston reciprocates and the oil thus scraped off the cylinder wall is collected in the groove. On the upward stroke of the piston A the oil thus collected in the groove in the piston ring will be discharged onto the cylinder wall to effectually lubricate the contacting surfaces of the piston rings, the piston and the wall of the cylinder in which the piston reciprocates. I prefer, as stated above, that the rear wall of the groove be substantially parallel to the front wall thereof and meet the lower end face of the ring at a point inside of the cylinder contacting face of the ring so that a space will be left between this meeting point and the cylinder wall through which space the oil may be more readily discharged onto the cylinder wall at the beginning of the upward stroke of the piston. This discharge of the oil from the groove will be aided by the downward inclination of the rear wall, as described above.

However, when the engine is operated at a high piston speed there is a tendency for oil to accumulate between the cylinder contacting face of the ring and the cylinder wall, which accumulation, I have found, increases in relation to the increase of the piston speed. In my improved ring I find that the slots F prevent the accumulation of oil between the cylinder wall and the contacting face of said ring by allowing the oil to flow therethrough into the space between the rear face of the ring D and the vertical bottom of the ring receiving groove B, from where it will pass through the ports H, or in the modified form through the ports K, into the hollow interior of the piston and thence back into the crank case. If the downwardly inclined ports H are provided, the oil simply drains from the space between the rear face of the ring and the vertical bottom of the ring receiving groove B. If the upwardly inclined ports K are provided the oil in the space between the rear face of the ring and the bottom of the ring receiving groove B will be forced through these ports by pumping like action.

My new and improved piston ring, therefore, will operate at all times and at all piston speeds to effectually prevent oil pumping since if any oil accumulates between the cylinder contacting face of the ring and the cylinder wall and thereby tend to force the cylinder contacting face of the ring away from the cylinder wall, the accumulated oil will be drained away and the peripherally disposed scraping edge arranged on the ring will be maintained in contact with the cylinder wall.

While my new and improved piston ring D may be placed in any of the ring receiving grooves B, I prefer that the ring D be placed in the lower thereof, as exemplified in the embodiment of my invention described above, because I have found that if the ring D be put in one of the upper grooves there may be a resultant loss of compression due to a leakage past that part of the cylinder contacting face of the ring above the slots F, and through the slots F and ports H or K. It also may be desirable to provide more than one of my new and improved piston rings to a piston.

It may be readily understood that I do not wish to limit myself to the exact embodiment of my invention shown in the drawings since it may be seen that, as stated above, the shape of the oil collecting groove in the ring, the shape and position of the passages, which in the drawings are shown as slots F, the exact position of the ports leading from the bottom of the ring receiving grooves B in the piston A, and the other details of construction may be varied within wide limits without deviating from the spirit of my invention.

What I claim as new and desire to secure by Letters Patent, is:—

A piston ring comprising a resilient split band having a groove therein and also having one or more passages leading from the cylinder contacting face of said ring to the rear face thereof and positioned above said groove, the front wall of said groove meeting said cylinder contacting face to form a scraping edge adapted on the downward stroke of the piston with which said ring is used to scrape oil from the wall of the cylinder in which said piston reciprocates, said groove being constructed and arranged to collect the oil thus scraped from the cylinder wall on the downward stroke of said piston, and said passages being positioned and arranged to remove any accumulation of oil between said cylinder contacting face and said cylinder wall whereby said scraping edge will be maintained in operative position in engagement with said cylinder wall.

In witness whereof I have signed my name to this specification.

ARDEN JOHN MUMMERT.